No. 607,598. Patented July 19, 1898.
C. CLOSZ.
GRAIN SEPARATING SCREEN FOR THRESHING MACHINES.
(Application filed Nov. 5, 1897.)
(No Model.)
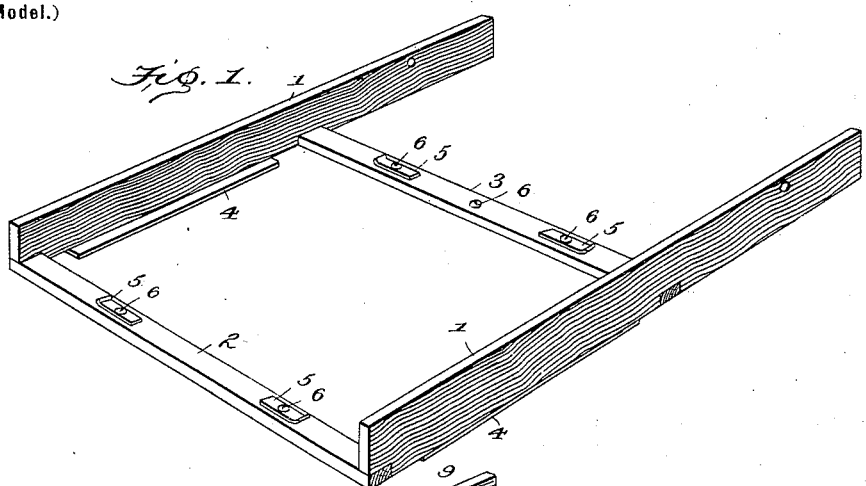
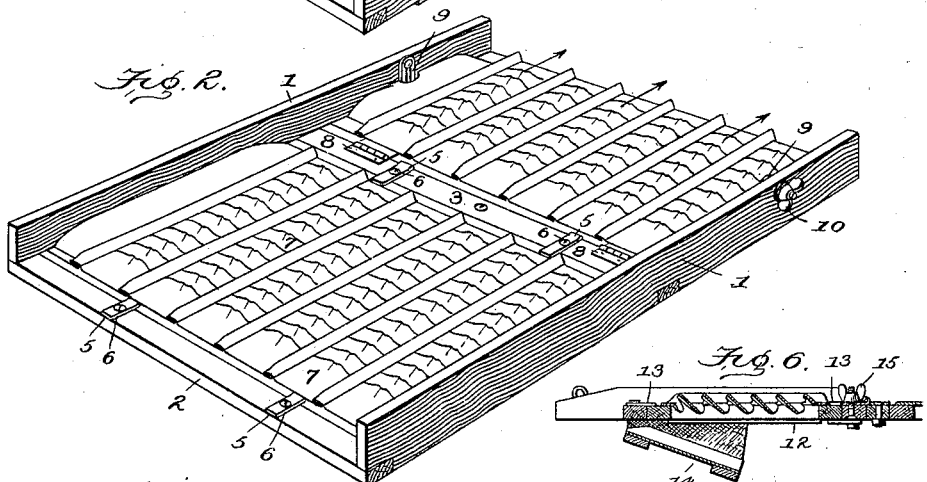
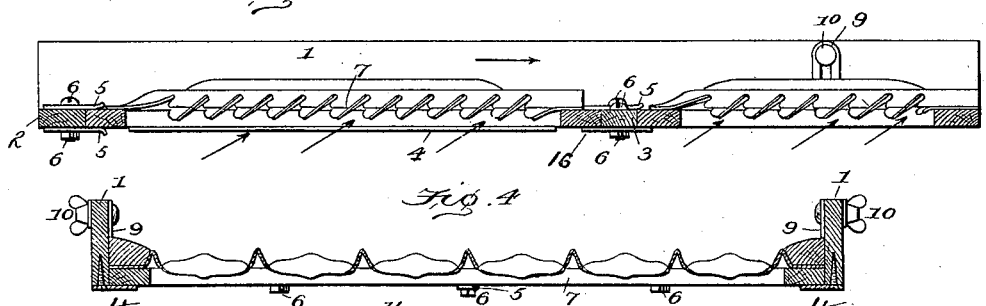
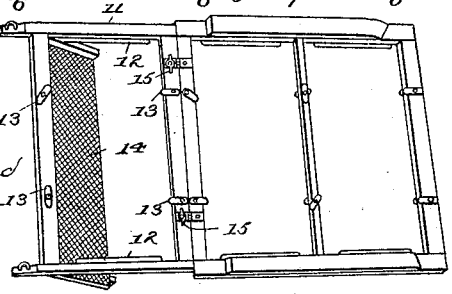
WITNESSES:
Edwin L. Bradford
Finis D. Morris
INVENTOR
Charles Closz
BY Johnson and Johnson
ATTORNEYS.
THE NORRIS PETERS CO., PHOTO-LITHO., WASHINGTON, D. C.

UNITED STATES PATENT OFFICE.

CHARLES CLOSZ, OF WEBSTER CITY, IOWA.

GRAIN-SEPARATING SCREEN FOR THRESHING-MACHINES.

SPECIFICATION forming part of Letters Patent No. 607,598, dated July 19, 1898.

Application filed November 5, 1897. Serial No. 657,537. (No model.)

*To all whom it may concern:*

Be it known that I, CHARLES CLOSZ, a citizen of the United States, residing at Webster City, in the county of Hamilton and State of Iowa, have invented certain new and useful Improvements in Grain-Separating Screens for Threshing-Machines, which I denominate an "interchangeable chaffer," of which the following is a specification.

The sieve device which embodies my improvement is designed for use with an end shake and an air-blast beneath the conveying-platform in threshing-machines and receives from said platform the chaff and other matters and separates them from the grain or seeds and is usually termed a "chaffer;" and the object of my improvement is to provide an interchangeable chaffer.

The particular features of my improvement will be pointed out in the claims concluding this specification.

The accompanying drawings illustrate my interchangeable chaffer, wherein—

Figure 1 shows in perspective the reciprocating frame adapted to receive the chaffer-screens. Fig. 2 is a like view showing the chaffer-screens seated and secured therein. Fig. 3 is a vertical longitudinal section of the same, and Fig. 4 is a cross-section of the same. Fig. 5 is a modification of the skeleton frame with three sieve-sections. Fig. 6 is a detail showing the end screen attached by the thumb-screws and having the canvas tail-shelf.

It will be understood that the frame is suitably mounted to receive the chaff and grain from the conveying-platform and that it is connected for an endwise shaking movement in the usual manner in threshing-machines.

The frame may be adapted to receive three sieve-sections, the sections being on the same plane and forming the separating-platform. The frame is composed of vertical sides 1 1, connected by cross-bars, one of which, 2, is at the inner end of the platform and the other, 3, about midway of the length of the frame and divides the frame into openings, within each of which a screen-section is adapted to be fitted. At the front of the frame its sides have plates 4 4 secured to their under edges, so that they project within the opening and form the supports or seats for the screen-section, which is fitted flush with the cross-bars and secured to them by turn-buttons 5, secured by nutted bolts 6 to the upper and under sides of the said bars. The turn-buttons are plates and may be secured to the bars in pairs, so that when turned over the screen-frames they are thereby firmly clamped to the cross-bars.

The screening-surfaces of the sections are of course suited for the work, and such surfaces are secured to frames fitting exactly the receiving-frame, so that the buttons can be turned over the upper and the under sides of the sieve-frames to clamp them tight together. By this construction the front or receiving screen-section 7, being seated upon the side plates 4 4, is bound thereon by turning the buttons over the frame of the seated section and clamping it. By turning the buttons off the sieve-frame it can be lifted off its side supports and replaced by another and different sieve.

The outer or delivery sieve is fitted between the frame sides and hinged to the cross-bar by hinges 8 8, and it is supported by slotted hangers 9 9, rising from the ends of the sieve-frame and adjustably secured to the frame sides by thumb-screws 10, whereby to adjust the screen as may be desired to regulate the discharge of the coarse matter. As the hinges of this sieve-section would be subjected to considerable strain by the shaking movement of the frame and the weight of the straw passing over it, I make the buttons to extend over and clamp the hinged end of this frame, and thereby clamp both sieve-frames to the middle cross-bar. This cross-bar, therefore, while serving as a support for the sieve-frames, serves also as a wind-brake to check any undue movement of the grain or seed over the chaffer-sieve, which is sometimes caused by too strong a wind-blast through the chaffer-sieve. In its function as a wind-brake the area of the cross-bar added to the areas of the joining frame-bars of the sieve-sections gives a distinct division to the wind-blast, so that the blast through the receiving-sieve is measurably reduced in volume and strength as it crosses between the two sieves, and the movement of the grain is thereby checked in its passage from one screen to the other. By raising the outer screen the movement of the grain or seed thereover is regulated to give the best effect in separating the grain and effecting its passage through the screen. In the drawings I have shown my patented screens, wherein the openings are formed transversely between raised corrugations and by bow-shaped elevations; but other separating-surfaces may be used in frames which are adapted for interchangeable seating in the skeleton frame.

In Fig. 5 is seen a frame of three sieve-sections, and when this construction is desired the outer or discharging sieve-section is formed of an independently-hinged frame 11, which is provided with side plates or ledges 12 and buttons 13, whereby to seat and secure the sieve-section. In this case the separating-surface will be interrupted by two transverse wind-brakes, and the discharging-section has an under tail-shelf 14 for giving a backward movement to the grain passing through at the outer end of the outer sieve. This end frame is attached by thumb-screws 15 to the hinges to allow it to be removed for shortening the screening-surface. The tail-shelf is formed of canvas stiffened by cleats and is, by reason of being flexible, caused to have a slight flapping movement under the force of the blast and shake of the screen.

The carrying-frame, as I have shown, is constructed of thin strips of wood for lightness, and the screen-frames are also of light strips, so that it is important to secure the meeting bars of both frames together to give strength and stiffness crosswise of the screen-frame to prevent the sagging of its cross-bars under the weight of the screening-surface. This bracing of the meeting cross-bars of the two frames is effected by the turn-buttons arranged to clamp them together, so that they form, in fact, a single bar, one bracing the other to give it transverse stiffness.

Referring to the hinged screen-section, it is important to note that the weight of its frame, if borne by the hinges only, would under the shaking vibration soon break the hinges or cause them to become loose, and to prevent this I provide the middle cross-bar on its under side with double turn-buttons 16, which serve as supports for the hinged cross-bar and also as supports for the meeting cross-bars of the receiving-screen, as in Fig. 3, the buttons for this purpose extending across the middle bar and beneath the meeting bars of the screen-frames.

I claim—

1. In a grain-separating screen a frame consisting of side bars having seat-forming plates for the screen, an end cross-bar and a middle cross-bar, the said cross-bars having turn-buttons 5, 5, arranged in clamping pairs, each pair secured by a nutted bolt, in combination with the screen-frames supported and clamped by their cross-bars to the frame cross-bars by said pairs of turn-buttons, whereby the cross-bars of the screen-frames are prevented from sagging.

2. In a grain-separating screen and in combination with the frame having the turn-buttons 5, 5, arranged in pairs on its cross-bars, the front sieve clamped between said turn-buttons, the hinged sieve, and the double turn-buttons 16 arranged to form supporting-seats for the meeting bars of both sieve-frames.

3. A grain-separating screen the cross-bars thereof provided with the turn-buttons 5, 5 arranged on the upper and under sides of said bars and the double turn-buttons 16 arranged on the under side of the middle cross-bar, in combination with the sieve-frames, one of which is hinged to said middle cross-bar.

CHARLES CLOSZ.

Witnesses:
 WESLEY MARTIN,
 KATE ANDREWS.